United States Patent
Rosolowsky et al.

(10) Patent No.: US 10,703,259 B1
(45) Date of Patent: Jul. 7, 2020

(54) VEHICLE COMPONENT CONTROL ASSEMBLY

(71) Applicant: Nissan North America, Inc., Franklin, TN (US)

(72) Inventors: Kurt Rosolowsky, Royal Oak, MI (US); Melaina Vasko, Highland Township, MI (US); Christopher Day, Birmingham, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/229,835

(22) Filed: Dec. 21, 2018

(51) Int. Cl.
| | |
|---|---|
| *B60Q 1/14* | (2006.01) |
| *B60Q 1/18* | (2006.01) |
| *B60K 37/02* | (2006.01) |
| *B60Q 1/00* | (2006.01) |
| *B60K 37/06* | (2006.01) |

(52) U.S. Cl.
CPC ............... *B60Q 1/18* (2013.01); *B60K 37/02* (2013.01); *B60K 37/06* (2013.01); *B60Q 1/0005* (2013.01); *B60Q 1/0076* (2013.01); *B60Q 2300/14* (2013.01)

(58) Field of Classification Search
None
See application file for complete search history.

(56) References Cited

U.S. PATENT DOCUMENTS

| | | | | |
|---|---|---|---|---|
| 5,854,537 | A * | 12/1998 | Gotoh | B60Q 1/085 315/82 |
| 7,717,592 | B2 | 5/2010 | Tyll et al. | |
| 7,830,247 | B2 | 11/2010 | Tyll et al. | |
| 2008/0259619 | A1 * | 10/2008 | Tyll | B60Q 1/0005 362/464 |
| 2012/0074842 | A1 | 3/2012 | Hattori et al. | |
| 2013/0151068 | A1 * | 6/2013 | Lee | B60K 37/02 701/36 |
| 2015/0283905 | A1 | 10/2015 | Obradovich | |

FOREIGN PATENT DOCUMENTS

WO    2011154691 A1    12/2011

* cited by examiner

*Primary Examiner* — Anh Q Tran
(74) *Attorney, Agent, or Firm* — Global IP Counselors, LLP (57) ABSTRACT

An electronic controller of a vehicle is in electronic communication with lamp cover condition sensors, a headlamp switch, an off-road lamp switch and an electronic display. The electronic controller is configured to turn on the off-road lamp device in response to the off-road lamp switch being switched to the on condition and further in response to each of a plurality of predetermined conditions being met, the electronic controller further being configured to prevent the off-road lamp device from turning on in response to the off-road lamp switch being switched to the on condition and further in response to at least one of the plurality of predetermined conditions not being met, the predetermined conditions including at least a determination that the removable lamp cover of the off-road device has been removed, and a determination that the headlamp switch is in the second operating condition.

15 Claims, 7 Drawing Sheets

VEHICLE COMPONENT CONTROL ASSEMBLY

BACKGROUND

Field of the Invention

The present invention generally relates to an off-road lamp control assembly. More specifically, the present invention relates to an off-road lamp control assembly that includes monitoring various sensor outputs and alerting a vehicle operator whether or not predetermined conditions are met.

Background Information

Many vehicles, such as SUVs (sports utility vehicles), pickup trucks, vans, as well as various four-wheel drive vehicles, are fitted with off-road lamps that are installed to, for example, the roof of the vehicle above a passenger compartment of the vehicle.

SUMMARY

On object of the present disclosure is to provide a vehicle that has off-road lamps with a visual feedback system informing a vehicle operator whether or not predetermined conditions are met when the off-road lamps are to be operated.

In view of the state of the known technology, one aspect of the present disclosure is to provide an off-road lamp control assembly with vehicle headlamps installed to a vehicle body assembly, a headlamp switch, an off-road lamp device, an off-road lamp switch, an electronic display and an electronic controller. The headlamp switch is configured to switch headlamps between a first operating condition and a second operating condition. The off-road lamp device has a lamp, a removable lamp cover and a lamp cover condition sensor. The off-road lamp switch is configured to switch the off-road lamps between an off condition and an on condition. The electronic display is configured to display data. The electronic controller is in electronic communication with the lamp cover condition sensor, the headlamp switch, the off-road lamp switch and the electronic display. The electronic controller is configured to turn on the off-road lamp device in response to the off-road lamp switch being switched to the on condition and further in response to each of a plurality of predetermined conditions being met. The electronic controller is further configured to prevent the off-road lamp device from turning on in response to the off-road lamp switch being switched to the on condition and further in response to at least one of the plurality of predetermined conditions not being met. The predetermined conditions include at least a determination that the removable lamp cover of the off-road device has been removed, and a determination that the headlamp switch is in the second operating condition.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
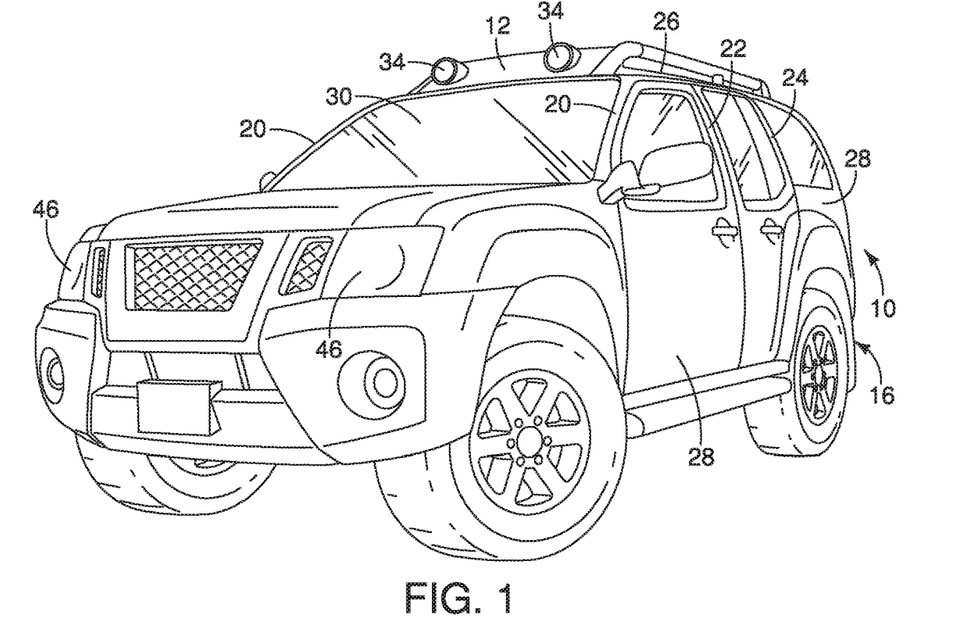
FIG. 1 is a perspective view of a vehicle that includes off-road lamps installed to the roof of the vehicle above a passenger compartment in accordance with an exemplary embodiment.
Figure 2:
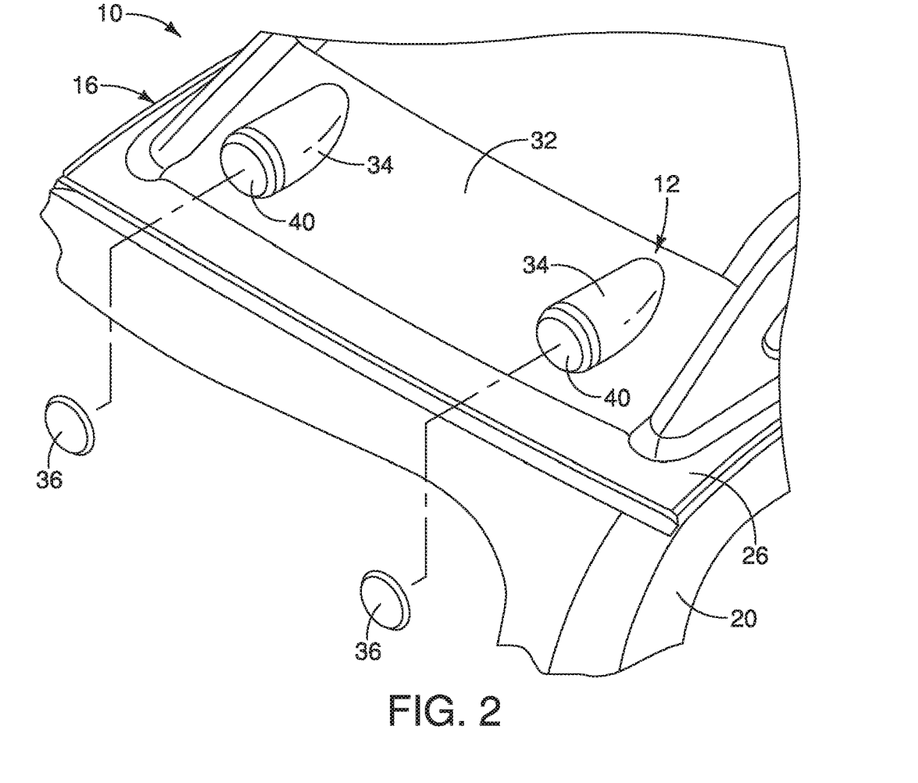
FIG. 2 is a perspective view of the roof of the vehicle showing details of the off-road lamps in accordance with the exemplary embodiment.

Referring initially to FIGS. 1 and 2, a vehicle 10 having a first electronically controlled vehicle component 12 and a first vehicle component control assembly 14 (FIG. 3) is illustrated in accordance with a depicted exemplary embodiment. In the depicted embodiment, the first electronically controlled vehicle component 12 is an off-road lamp device 12, as described in greater detail below.

The vehicle 10 includes a vehicle body structure 16. The vehicle body structure 16 is defined by various vehicle structures, such as A-pillars 20, B-Pillar 22, C-pillars, 24 (only one of each of the pillars is shown in FIG. 1), a roof structure 26 and doors 28. The A-pillars 20, the B-Pillar 22, the C-pillars, 24, and a roof structure 26 at least partially define a passenger compartment 30. Since vehicle body structures, such as the vehicle body structure 16, are conventional structures, further description is omitted for the sake of brevity.

As shown in FIGS. 1 and 2, the off-road lamp device 12 (the first electronically controlled vehicle component 12) is fixedly attached to the roof structure 26 of the vehicle body structure 16 of the vehicle 10.

It should be understood from the drawings and the description herein, that the vehicle 10 can be any of a variety of vehicle designs. For example, in FIG. 1, the vehicle 10 is shown as a four-wheel drive SUV. The design of the vehicle 10 can also be a pickup truck, a van, a commercial truck, any vehicle design that includes a four-wheel drive train, or any vehicle designed for off-road driving operation. Further, the vehicle 10 can be any vehicle design that can be or is equipped with off-road lamp devices.

As shown in FIG. 2, the off-road lamp device 12 includes a base 32, lamp housings 34 and covers 36. The base 32 is fixedly attached to the roof structure 26 of the vehicle 10 via, for example, fasteners (not shown) such as rivets, threaded fasteners, or the like. Alternatively, the base 32 can be integrally formed with the roof structure 26 such that the lamp housings 34 fasten directly to the roof structure 26.

In the depicted embodiment as shown in FIG. 2, the lamp housings 34 are fixed at opposite lateral sides of the base 32. Each lamp housing 34 includes a lamp (not shown) that is selectively illuminated in a manner described in greater detail below. Each lamp housing 34 also includes a cover switch or cover sensor 38 that detects the presence or absence of a corresponding one of the covers 36. In other words, the cover sensor 38 detects whether or not the cover 36 is installed on the corresponding lamp housing 34, covering the lamp (not shown). The cover sensors 38 can be electromagnetic sensors and the covers 36 can include a small magnet such that the electromagnetic sensors detect the presence of the magnets in the covers 36. However, in the depicted embodiment, the cover sensors 38 are mechanical switches that close a circuit in response to the covers 36 being installed to respective ones of the lamp housings 34.

The covers 36 are conventional covers designed to be fitted on to corresponding ones of the lamp housings 34, covering the lamp and corresponding lamp lens 40 of the lamp housing 34 when the off-road lamp device 12 is not in use. The covers 36 are manually removed from the lamp housings 34 when the off-road lamp device 12 is to be used or in use.

The vehicle 10 includes a plurality of additional electronic vehicle components in addition to the off-road lamp device 12. Each of the plurality of additional electronic vehicle components is configured to operate in at least two different operating conditions, as described below.

Specifically, the plurality of additional electronic vehicle components includes, for example, an off-road lamp switch 44, vehicle headlamps 46 with a corresponding headlamp switch 48, a high beam switch 50 and the cover sensors 38.

The off-road lamp switch 44 is switchable between a first operating condition and a second operating condition, where the first operating condition is an off condition (lamps of the off-road lamp device 12 turned off) and the second operating condition is an on condition (lamps of the off-road lamp device 12 turned on).

The headlamps 46 are installed to a front area of the vehicle body structure 16, as shown in FIG. 1. Each of the headlamps 46 includes lamps that are operable to emit low beam light and also emit high beam light in a conventional manner.

The headlamp switch 48 is switchable between a first operating condition and a second operating condition, where the first operating condition is an off condition (headlamps 46 turned off) and the second operating condition is an on condition (headlamps 46 turned on).

The high beam switch 50 is switchable between a first operating condition and a second operating condition, where the first operating condition corresponds to the headlamps 46 being operable with only low beam light being emitted, and the second operating condition corresponds to the headlamps 46 being operable with high beam light being emitted.

The cover sensors 38 is switchable via presence or absence of the covers 36 between a first operating condition and a second operating condition, where the first operating condition corresponds to the covers 36 being installed on the lamp housings 34 and the second operating condition corresponds to the covers 36 being removed from the lamp housings 34.

Figure 3:
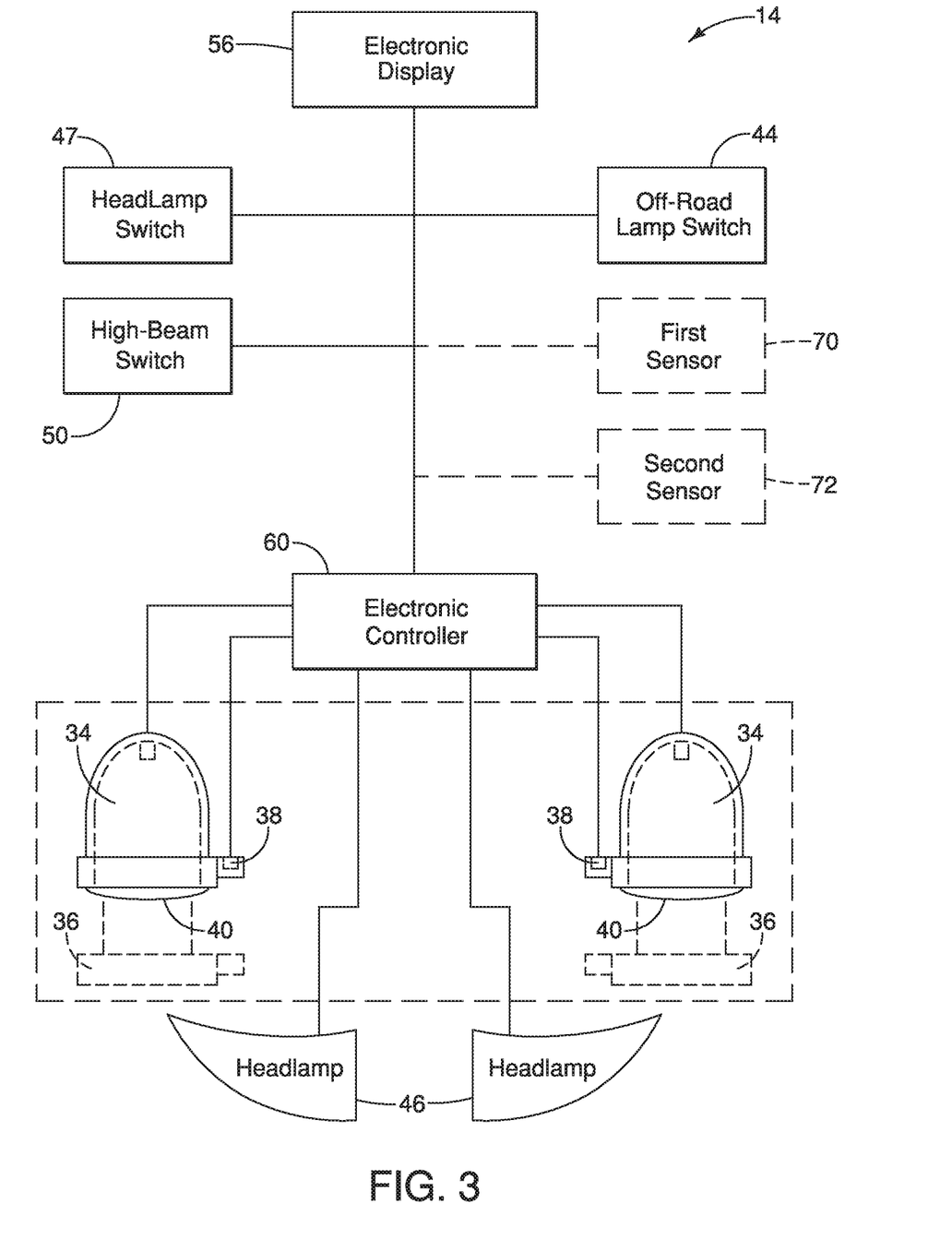
FIG. 3 is a block diagram of various electronic components of an off-road lamp control assembly, including an electronic display installed to an instrument panel cluster and an electronic controller in accordance with the exemplary embodiment.

A description of the first vehicle component control assembly 14 is now provided with specific reference to FIGS. 3-9. As shown in FIG. 3, the first vehicle component control assembly 14 includes the lamps (not shown) of the off-road lamp device 12, the off-road lamp switch 44, the vehicle headlamps 46, the headlamp switch 48, the high beam switch 50, the cover sensors 38, an electronic display 56 installed within an instrument cluster 58 and an electronic controller 60.

As shown in FIG. 3, the lamps (not shown) of the off-road lamp device 12, the off-road lamp switch 44, the vehicle headlamps 46, the headlamp switch 48, the high beam switch 50, the cover sensors 38, and the electronic display 56 are all in electronic communication with the electronic controller 60.

Figure 4:
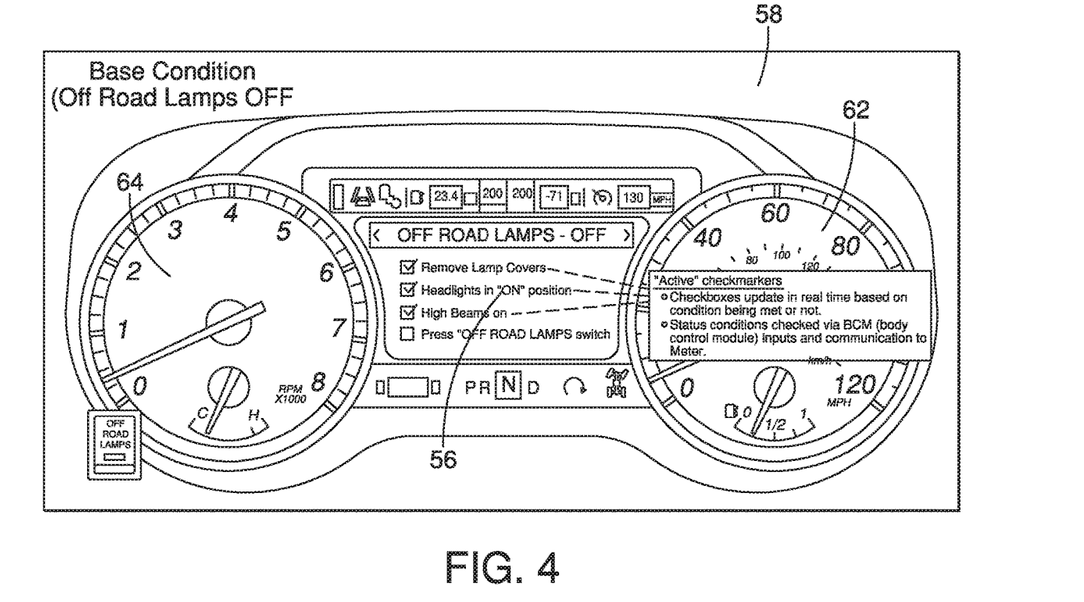
FIG. 4 is a schematic view of the instrument panel showing the electronic display, the electronic display displaying text that includes a list predetermined conditions that are to be met before the off-road lamps can be turned on, and further displaying the text OFF ROAD LAMPS OFF, in accordance with the exemplary embodiment.
Figure 5:
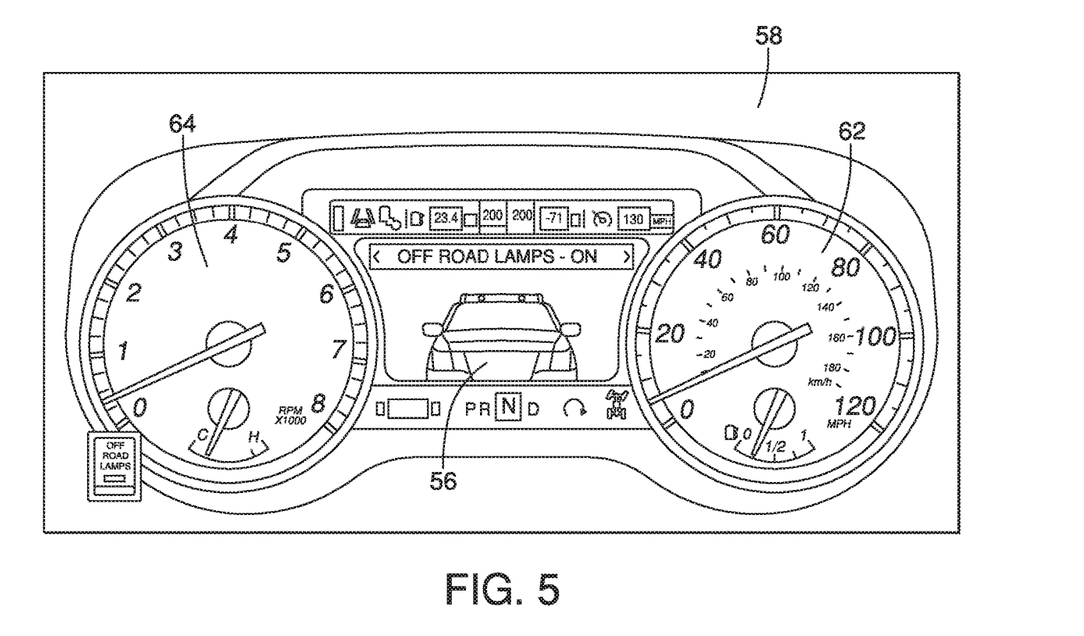
FIG. 5 is a schematic view of the instrument panel showing the electronic display, the electronic display displaying text indicating OFF ROAD LAMPS ON in accordance with the exemplary embodiment.

The instrument cluster 58 shown in FIGS. 4 and 5 is installed on or within an instrument panel (not shown) below the windshield of the vehicle 10 within the passenger compartment 30 in a conventional manner. Since instrument panels within passenger compartments are conventional structures, further description is omitted for the sake of brevity.

The operation of the electronic display 56 is controlled by the electronic controller 60. As shown in FIGS. 4 and 5, the electronic display 56 is located between a speedometer 62 and a tachometer 64 of the instrument cluster 58, and, is forward of the vehicle operator such that the vehicle operator can easily see any data displayed thereon. The electronic display 56 is configured (via the electronic controller 60) to display a variety of vehicle related information, including operating condition data from each of the plurality of additional electronic vehicle components. For example, the electronic display 56 can scroll through many different menus, including but not limited to, vehicle maintenance data, tire pressure data, and, the operating condition data relating to operation of the off-road lamp device 12, as is described further herein below.

Specifically, as shown in FIG. 4, the electronic display 56 can display text that includes a list predetermined conditions that are to be met before the off-road lamp device 12 can be turned on, and further displaying that the off-road lamps device 12 is off. As shown in FIG. 5, the electronic display, the electronic display 56 can also displaying text indicating that the off-road lamp device 12 is turned off.

As mentioned above, the electronic controller 60 is electronically connected to each of the lamps (not shown) of the off-road lamp device 12, the off-road lamp switch 44, the vehicle headlamps 46, the headlamp switch 48, the high beam switch 50, the cover sensors 38 and the electronic display 56.

The electronic controller 60 controls the operation of the off-road lamp device 12 in response to a manual change (by a vehicle operator or passenger) of the condition of the off-road lamp switch 44, and in response to the predetermined conditions being met, as described further below. More specifically, the electronic controller 60 can include a relay or can be connected to a relay (not shown) that supplies power to the off-road lamp device 12 or, cut power to the off-road lamp device 12.

The electronic controller 60 can also control the operation of the headlamps 46 in response to a manual change (by a vehicle operator or passenger) of the condition of the headlamp switch 48. More specifically, the electronic controller 60 can include a relay or can be connected to a relay (not shown) that supplies power to the headlamps 46, or, cut power to the headlamps 46.

The electronic controller 60 can also control the operation of the high beams of the headlamps 46 in response to a manual change (by a vehicle operator or passenger) of the condition of the high beam switch 50. More specifically, the electronic controller 60 can include a relay or can be connected to a relay (not shown) that supplies power to the high beams of the headlamps 46, or, cut power to the high beams of the headlamps 46.

The electronic controller 60 is configured to determine current operating conditions of each of the plurality of additional electronic vehicle components and operate the electronic display 56 to show an indication of the current operating condition of each of the plurality of additional electronic vehicle components, as described below. More specifically, the electronic controller 60 is configured to determine whether or not a predetermined combination of the current operating condition of each of the plurality of additional electronic vehicle components meets predetermined requirements for operation of the off-road lamp device 12 (the first electronically controlled vehicle component). The electronic controller 60 is further configured to display on the electronic display 56 each of the current operating conditions and whether or not the predetermined combination of the current operating condition of each of the plurality of additional electronic vehicle components has been met.

Further, the electronic controller 60 is configured to turn on the off-road lamp device 12 in response to the off-road lamp switch 44 being switched to the on condition and further in response to each of a plurality of predetermined conditions being met. The electronic controller 60 is further configured to prevent the off-road lamp device 12 from turning on in response to the off-road lamp switch 44 being switched to the on condition and further in response to at least one of the plurality of predetermined conditions not being met. Similarly, the electronic controller 60 is further configured to operate the electronic display 56 and display each of the plurality of predetermined conditions and display whether or not each condition has been met. As well, the electronic controller 60 is further configured to operate the electronic display 56 and display whether or not the lamp of the off-road lamp device is currently illuminated.

In the depicted exemplary embodiment, at least the following conditions are monitored by the electronic controller 60: 1) the headlamp switch 48 being switched between a headlamps on condition and a headlamps off condition; 2) the high beam switch 50 being switched between a low beam condition and a high beam condition of the vehicle headlamps 46; 3) the cover sensors 38 detecting that the covers 36 are installed to the lamp housings 34 of the off-road lamp device 12 or have been removed from the lamp housings 34 of the off-road lamp device 12; and 4) the off-road lamp switch 44 being switched between the lamp housings 34 being supplied with power (an on condition) and the lamp housings 34 having no power supplied thereto (an off condition).

The predetermined conditions that are to be met prior to the lamp housings 34 being supplied with power by the electronic controller 60 in the first embodiment include: 1) the headlamp switch 48 being in the on condition; 2) the high beam switch 50 being in the on condition; 3) cover sensors 38 detecting that the covers 36 have been removed; and 4) that the off-road lamp switch 44 is in the on condition.

It should be understood from the drawings and the description herein that the predetermined conditions that are to be met prior to turning the lamp housings 34 on (turning on the off-road lamp device 12) can include various combinations of conditions, and, is not limited to the above described conditions. For example, a first sensor 70 can be configured to detect a first alternative or additional condition, such as whether or not the engine is running (and/or the condition of the ignition key, on or off). A second sensor 72 can be configured to detect a second alternative or addition condition, such as the speed of the vehicle 10. For example, if the speed of the vehicle is above a predetermined speed, the electronic controller 60 can be configured to cut power to the off-road lamp device 12 and allow power to be supplied to the off-road lamp device 12 if the vehicle speed is below a predetermined speed.

A description of one example of logic used by the electronic controller 60 is now provided with specific reference to FIGS. 6-9.

At step S1, the electronic controller 60 monitors the condition of the cover sensors 38 and determines whether or not the covers 36 have been removed from the lamp housings 34. If not, operation moves to step S2 where the electronic controller 60 changes the condition of the covers 36 to "Covers On". If the cover sensors 38 indicate that the covers 36 have been removed, at step S3 the electronic controller 60 changes the condition of the covers 36 to "Covers Off". If the status or condition of the covers 36 has not changed since the last iteration of the flowchart in FIG. 6, then the electronic controller 60 merely confirms that the condition of the covers 36 already stored in memory.

Figure 6:
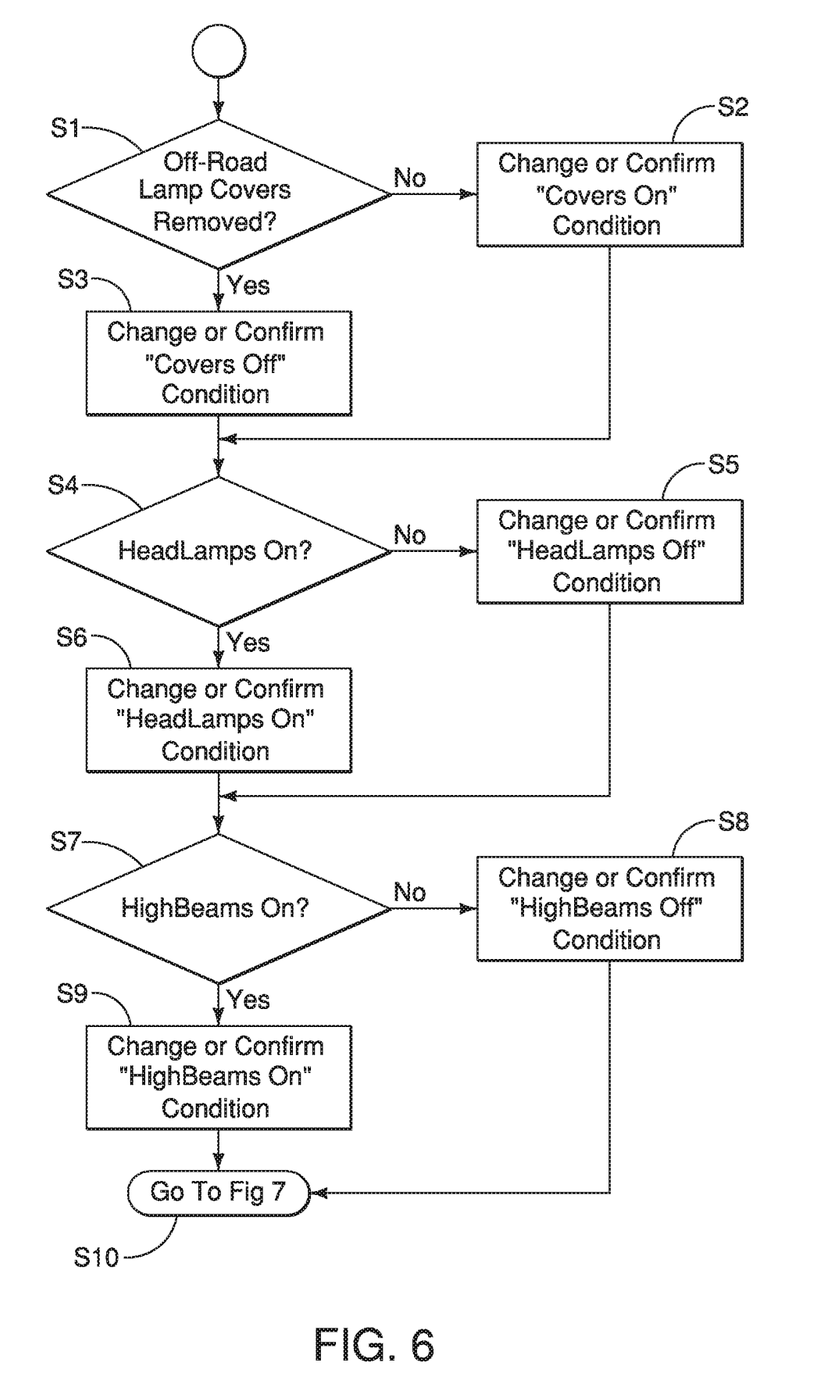
FIG. 6 is a first flowchart showing operational steps performed by the electronic controller as the electronic controller monitors signals from various sensors and switches related to operation of the vehicle and the off-road lamps, with the electronic controller further operating the electronic display to display current conditions of selected ones of the sensors and/or switches, in accordance with the exemplary embodiment.

Next, at step S4, the electronic controller 60 monitors the condition of the headlamp switch 48 and determines whether or not the headlamps 46 are on. If the headlamp switch 48 is in the off condition, operation moves to step S5 where the condition of the headlamps 46 is confirmed or changed to "Headlamps Off". Thereafter, operation moves to step S7.

Returning to step S4, if the headlamps are on, the operation moves to step S6 where the condition of the headlamps 46 is confirmed or changed to "Headlamps On". Thereafter, operation moves to step S7.

At step S7, the electronic controller 60 monitors the condition of the high beam switch 50 and determines whether or not the high beams of the headlamps 46 are on. If the high beam switch 50 is in the off condition, operation moves to step S8 where the condition of the high beams of the headlamps 46 is confirmed or changed to "High Beams Off". Thereafter, operation moves to step S10. At step S7, if the high beam switch 50 is in the on condition, operation moves to step S9 where the condition of the high beams of the headlamps 46 is confirmed or changed to "High Beams On". Thereafter, operation moves to step S10 and on to FIG. 7.

Figure 7:
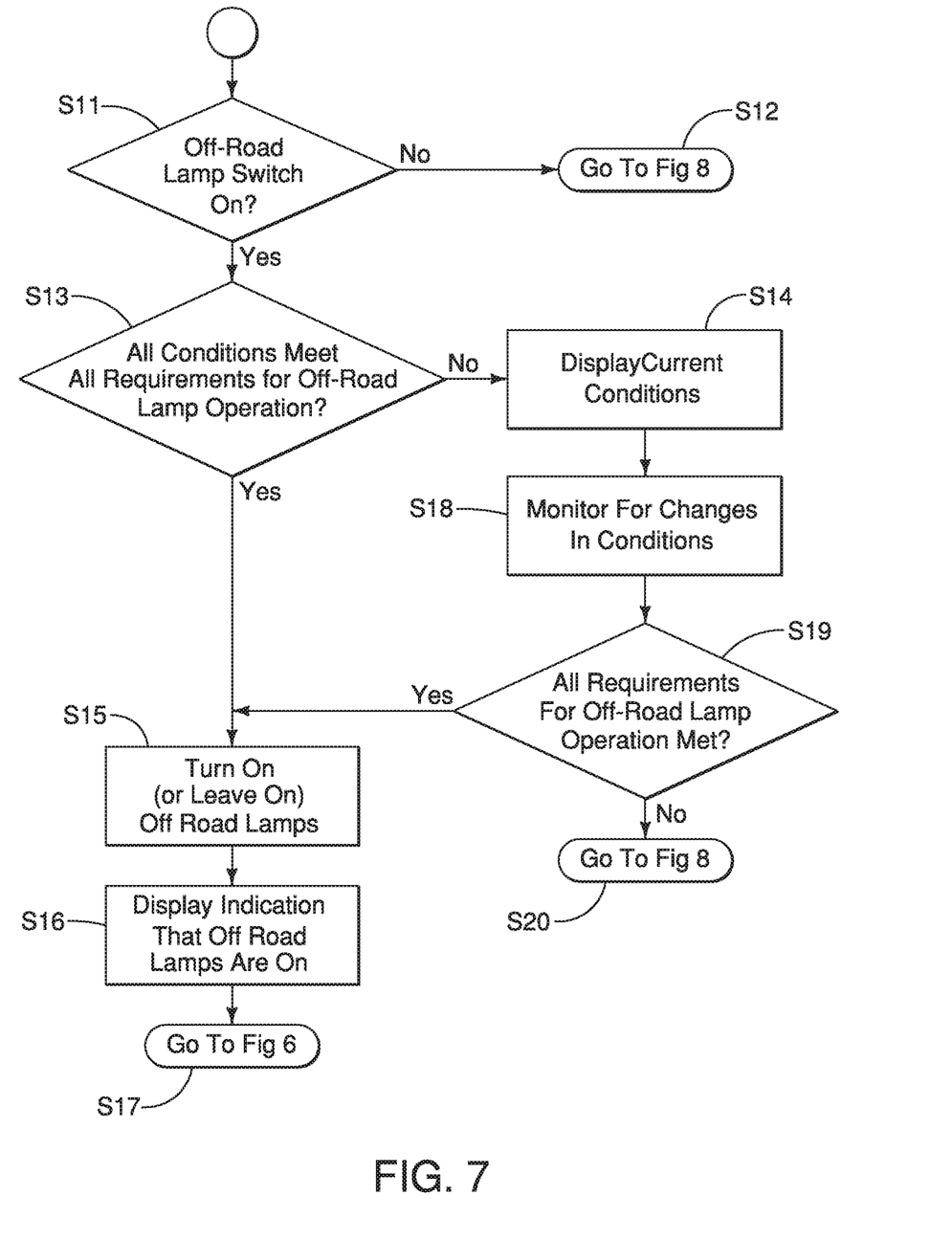
FIG. 7 is a second flowchart that is a continuation of the operational steps shown in the flowchart depicted in FIG. 6 in accordance with the exemplary embodiment.

At the top of FIG. 7 at step S11, the electronic controller 60 monitors the condition of the off-road lamp switch 44 and determines whether or not the off-road lamp device 12 are on. If the off-road lamp switch 44 is in the off condition, operation moves to step S12 and to FIG. 8. At step S11, if off-road lamp switch 44 is in the on condition, operation moves to step S13.

At step S13, the electronic controller 60 determines whether or not all monitored conditions meet all the requirements of the predetermined conditions for operation of the off-road lamp device 12. If no, operation moves to step S14, as described below. If yes, operation moves to step S15 where the off-road lamps of the off-road lamp device 12 are turned on, or, remain on (if already on). Next at step S16, the electronic controller 60 operates the electronic display 56 to display the indication that the off road lamps of the off-road lamp device 12 are on.

At step S14 the electronic controller 60 operates the electronic display 56 to display the current conditions just monitored by the electronic controller 60. Next at step S18, the electronic controller 60 again cycles through the monitoring steps as described above with respect to steps S1 thru S10 in FIG. 6, and step S11 in FIG. 7. Next at step S19, the electronic controller 60 again determines whether all not all predetermined conditions have been met for operation of the off-road lamp device 12. If all predetermined conditions are met, then the off-road lamp device 12 can be operated and the electronic controller 60 moves on to Step S15 in FIG. 7. If the predetermined conditions have not been met, then operation moves to step S20 and FIG. 8.

Figure 8:
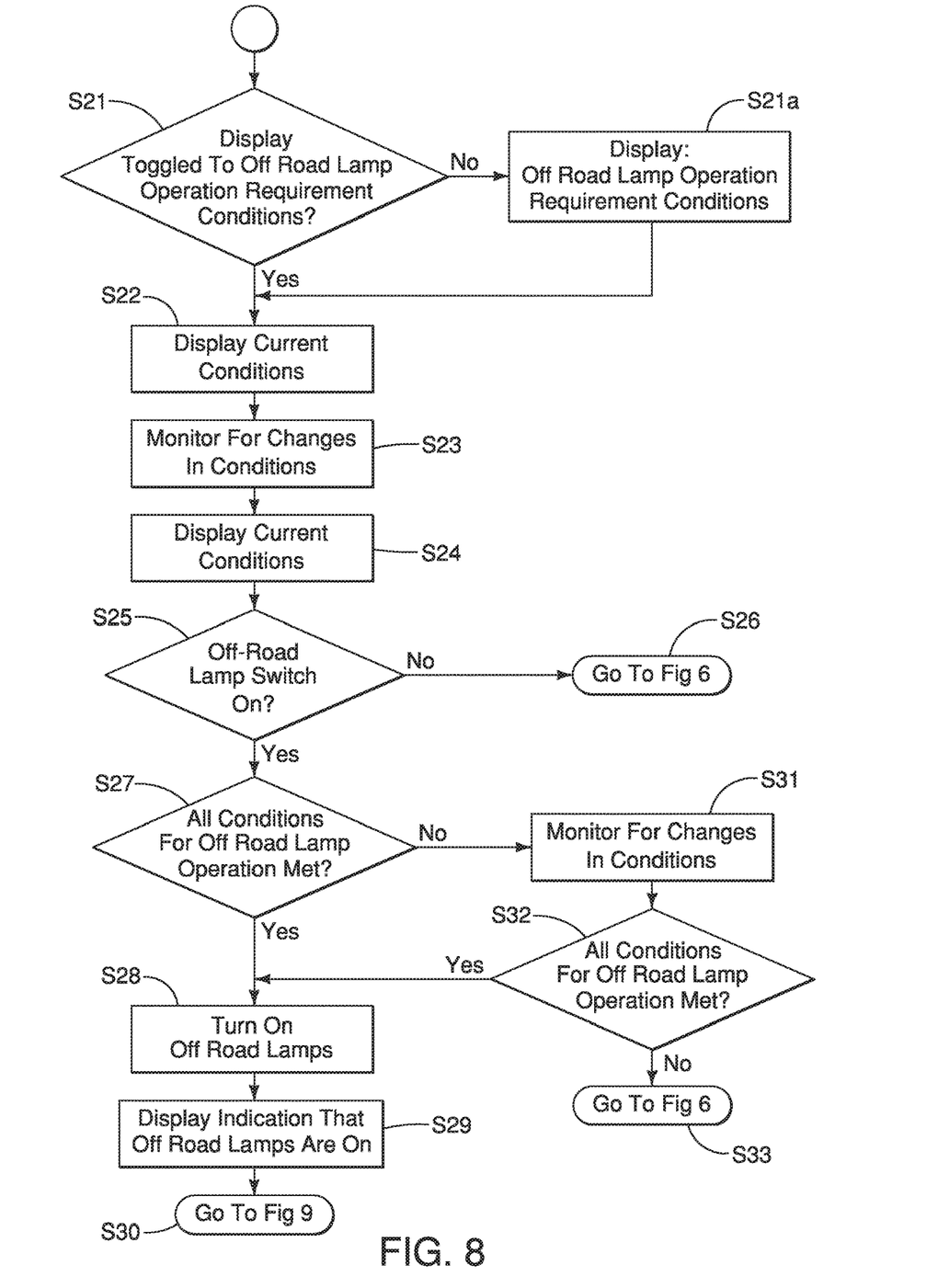
FIG. 8 is a third flowchart that is a continuation of the operational steps shown in the flowcharts depicted in FIGS. 6 and 7 in accordance with the exemplary embodiment.

In FIG. 8 at step S21, the electronic controller 60 determines whether or not the electronic display 56 has been toggled from one of its many display screens to the Off-Road Lamp Operation Requirement Conditions screen, shown in FIG. 4. If not, operation moves to step S21a. At step S21a, the electronic controller 60 operates the electronic display 56 to display the Off-Road Lamp Operation Requirement Conditions screen, shown in FIG. 4.

At step S21, if yes, then operation moves to step S22, where current operation conditions are displayed, similar to the display in FIG. 4. Next at step S23, the electronic controller 60 again cycles through the monitoring steps as described above with respect to steps S1 thru S10 in FIG. 6, and step S11 in FIG. 7. At step S24, the electronic controller 60 operates the electronic display 56 to display current operation conditions.

Next at step S25, the electronic controller 60 determines whether or not the off-road lamp switch 44 is on or not. If not, operation moves to step S26 and to the beginning of FIG. 6. If yes, operation moves to step S27. At step S27, the electronic controller determines whether or not all monitored conditions meet all the requirements of the predetermined conditions for operation of the off-road lamp device 12. If no, operation moves to step S31, as described below. If yes, operation moves to step S28 where the off-road lamps of the off-road lamp device 12 are turned on, or, remain on (if already on). Next at step S29, the electronic controller 60 operates the electronic display 56 to display the indication that the lamps of the off-road lamp device 12 are on.

Figure 9:
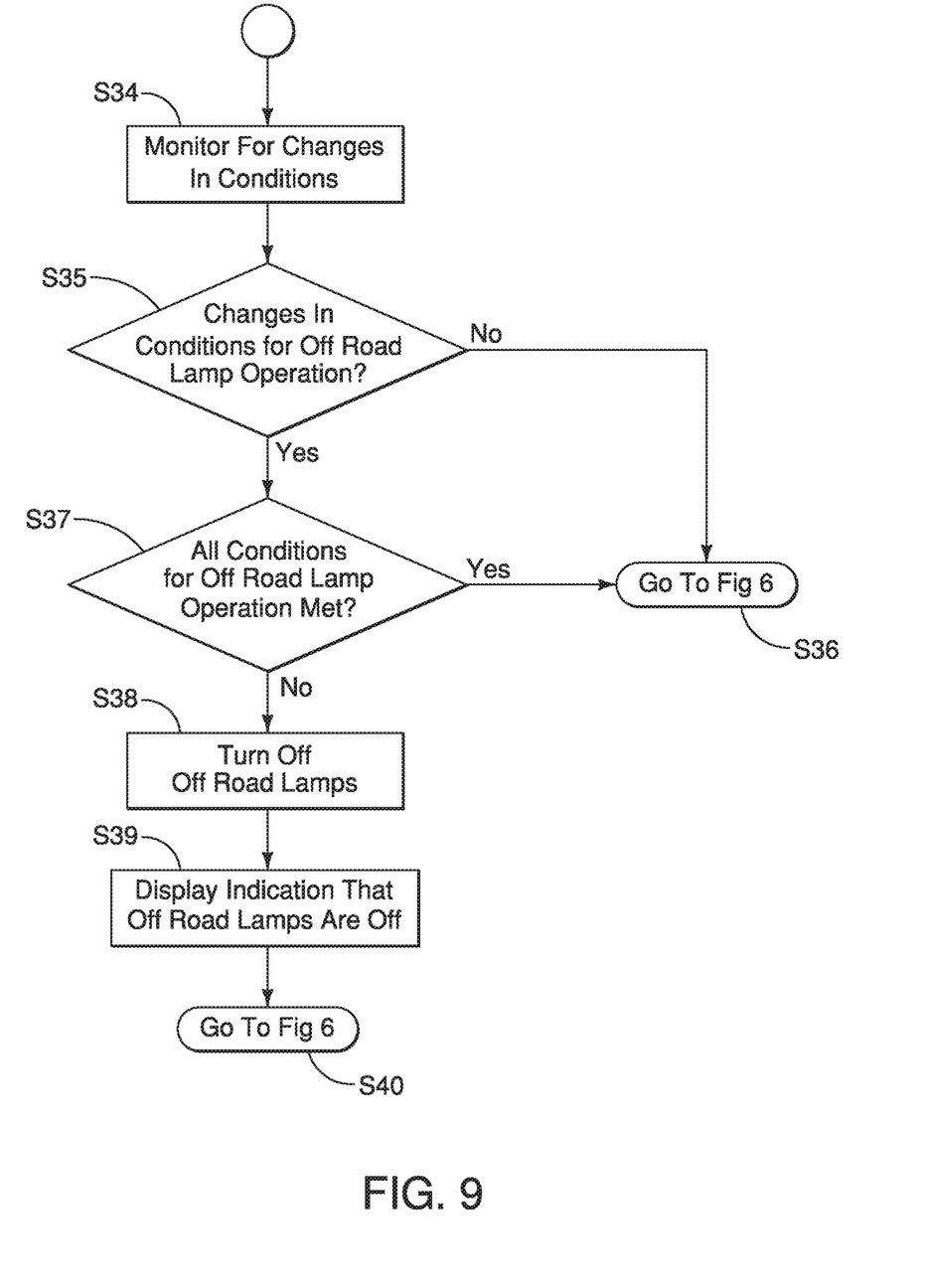
FIG. 9 is a fourth flowchart that is a continuation of the operational steps shown in the flowcharts depicted in FIGS. 6, 7 and 8 in accordance with the exemplary embodiment.

At step S30, operation moves to the flowchart in FIG. 9. Returning to step S31, the electronic controller 60 again cycles through the monitoring steps as described above with respect to steps S1 thru S10 in FIG. 6, and step S11 in FIG. 7. At step S31, the electronic controller determines whether or not all monitored conditions meet all the requirements of the predetermined conditions for operation of the off-road lamp device 12. If yes, operation moves to step S28. If not, operation moves to step S33 and back to the steps depicted in FIG. 6.

At step S34 in FIG. 9, the electronic controller 60 again cycles through the monitoring steps as described above with respect to steps S1 thru S10 in FIG. 6, and step S11 in FIG. 7. At step S35, the electronic controller 60 determines whether or not any of the predetermined conditions have changed. If no, operation moves to step S36 where operation returns to the beginning of the flowchart shown in FIG. 6. If yes, then operation moves to step S37. At step S37, the electronic controller 60 determines whether or not all monitored conditions continue to be meet all the requirements of the predetermined conditions for operation of the off-road lamp device 12. If yes, operation moves to step S36. If no, operation moves to step S38 where the off-road lamps of the off-road lamp device 12 are turned off. Next at step S39, the electronic controller 60 operates the electronic display 56 to display the indication that the lamps of the off-road lamp device 12 are off. Control then moves to step S40 and the beginning of the flowchart depicted in FIG. 6.

The above described logic is one example that can be used by the electronic controller 60. Other combinations of logic steps can be used in order to determine whether or not the predetermined conditions for operation of the off-road lamp device 12 have been met.

In accordance with the above logic, the vehicle operator can operate the electronic display 56 and toggle through the various displays and eventually display the Off-Road Lamp Operation Requirement Conditions screen, as shown in FIG. 4. The vehicle operator can then see which of the predetermined conditions are met without operating the off-road lamp switch 44. If all three predetermined conditions are met, covers 36 off, the headlamp switch 48 on, and high beam switch 50 on, then the vehicle operator knows that he or she can operate the off-road lamp switch 44 and turn on the off-road lamp device 12.

Alternatively, if the vehicle operator operates the off-road lamp switch 44 switching it to the on condition, the electronic controller 60 automatically displays the Off-Road Lamp Operation Requirement Conditions screen, if not all predetermined conditions are met. However, if all three predetermined conditions are met, since the headlamp switch 48 has already been switched on, the off-road lamp device 12 is provided with power by the electronic controller 60 and provides light to an area forward of the vehicle 10.

The electronic controller 60 preferably includes a microcomputer with a vehicle systems control program that controls the various vehicle operations, including operation of the off-road lamp device 12, as discussed above. The electronic controller 60 can be a body control module (BCM) or other control circuitry of the vehicle 10. The electronic controller 60 can also include other conventional components such as an input interface circuit, an output interface circuit, and storage devices such as a ROM (Read Only Memory) device and a RAM (Random Access Memory) device. The electronic controller 60 is capable of selectively controlling any of the components of the vehicle systems in accordance with a control program. It will be apparent to those skilled in the art from this disclosure that the precise structure and algorithms for the electronic controller 60 can be any combination of hardware and software that will carry out the functions of the present invention.

The microcomputer of the electronic controller 60 further is programmed to operate the electronic display 56. The electronic display 56 can be a simple flat screen monitor or can have a touch sensitive surface such that toggling between data screens is accomplished by touching the electronic display 56. The electronic controller 60 is operatively coupled to the various switches, the electronic display 56 and lamps described above in a conventional manner.

The vehicle structures and elements are conventional components that are well known in the art. Since such structures and elements are well known in the art, these structures will not be discussed or illustrated in detail herein.

Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle component control assembly. Accordingly, these terms, as utilized to describe the present invention should be interpreted relative to a vehicle equipped with the vehicle component control assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle component control assembly, comprising:
vehicle headlamps installed to a vehicle body assembly;
a headlamp switch configured to switch headlamps between a first operating condition and a second operating condition;
an off-road lamp device having a lamp, a removable lamp cover and a lamp cover condition sensor;
an off-road lamp switch configured to switch the off-road lamps between an off condition and an on condition;
an electronic display configured to display data; and
an electronic controller in electronic communication with the lamp cover condition sensor, the headlamp switch, the off-road lamp switch and the electronic display, the electronic controller being configured to turn on the off-road lamp device in response to the off-road lamp switch being switched to the on condition, a determination that the removable lamp cover of the off-road device is removed, and a determination that the headlamp switch is in the second operating condition and the electronic controller further being configured to prevent the off-road lamp device from turning on in response to the off-road lamp switch being switched to the on condition and at least one of a determination that the removable lamp cover of the off-road device has not been removed, and a determination that the headlamp switch is not in the second operating condition.

2. The vehicle component control assembly according to claim 1, wherein
the electronic controller is further configured to operate the electronic display and display whether or not the lamp of the off-road lamp device is currently illuminated.

3. The vehicle component control assembly according to claim 2, wherein
the electronic display is installed within an instrument cluster between an odometer and a speedometer.

4. The vehicle component control assembly according to claim 1, wherein
the electronic display is installed within an instrument cluster between an odometer and a speedometer.

5. The vehicle component control assembly according to claim 1, wherein
the first operating condition of the headlamp switch is a low beam on condition, and
the second operating condition of the headlamp switch is a high beam on condition.

6. The vehicle component control assembly according to claim 1, wherein
the first operating condition of the headlamp switch is an off condition, and
the second operating condition of the headlamp switch is an on condition.

7. The vehicle component control assembly according to claim 6, further comprising
a high beam switch in electronic communication with the electronic controller, the high beam switch being configured to switch the vehicle headlamps between a low beam condition and a high beam condition.

8. The vehicle component control assembly according to claim 7, wherein
one of the plurality of predetermined conditions is the headlamp switch being the high beam on condition.

9. The vehicle component control assembly according to claim 1, wherein
the off-road lamp device includes a pair of spaced apart lamps and
the removable lamp cover includes a pair of removeable covers, one for each of the lamps of the off-road lamp device.

10. The vehicle component control assembly according to claim 9, wherein
the lamp cover condition sensor of the off-road lamp device includes a pair of lamp cover condition sensors, one lamp cover condition sensor for each of the removable covers.

11. The vehicle component control assembly according to claim 10, wherein
each of the pair of lamp cover condition sensors includes a mechanical switch.

12. A vehicle component control assembly, comprising:
vehicle headlamps installed to a vehicle body assembly;
a headlamp switch configured to switch headlamps between a first operating condition and a second operating condition;
an off-road lamp device having a lamp, a removable lamp cover and a lamp cover condition sensor;
an off-road lamp switch configured to switch the off-road lamps between an off condition and an on condition;
an electronic display configured to display data; and
an electronic controller in electronic communication with the lamp cover condition sensor, the headlamp switch, the off-road lamp switch and the electronic display, the electronic controller being configured to turn on the off-road lamp device in response to the off-road lamp switch being switched to the on condition, a determination that the removable lamp cover of the off-road device is removed, and, a determination that the headlamp switch is in the second operating condition
the electronic controller further being configured to prevent the off-road lamp device from turning on in response to the off-road lamp switch being switched to the on condition and a determination that the removable lamp cover of the off-road device has not been removed, and
the electronic controller further being configured to prevent the off-road lamp device from turning on in response to the off-road lamp switch being switched to the on condition and a determination that the headlamp switch is not in the second operating condition.

13. The vehicle component control assembly according to claim 12, wherein
the first operating condition of the headlamp switch is a low beam on condition, and
the second operating condition of the headlamp switch is a high beam on condition.

14. The vehicle component control assembly according to claim 12, wherein
the first operating condition of the headlamp switch is an off condition, and
the second operating condition of the headlamp switch is an on condition.

15. The vehicle component control assembly according to claim 12, further comprising
a high beam switch in electronic communication with the electronic controller, the high beam switch being configured to switch the vehicle headlamps between a low beam condition and a high beam condition.

* * * * *